No. 822,560. PATENTED JUNE 5, 1906.
W. H. THOMPSON & C. J. SWANK.
LUBRICATING CAR WHEEL.
APPLICATION FILED JUNE 14, 1905.
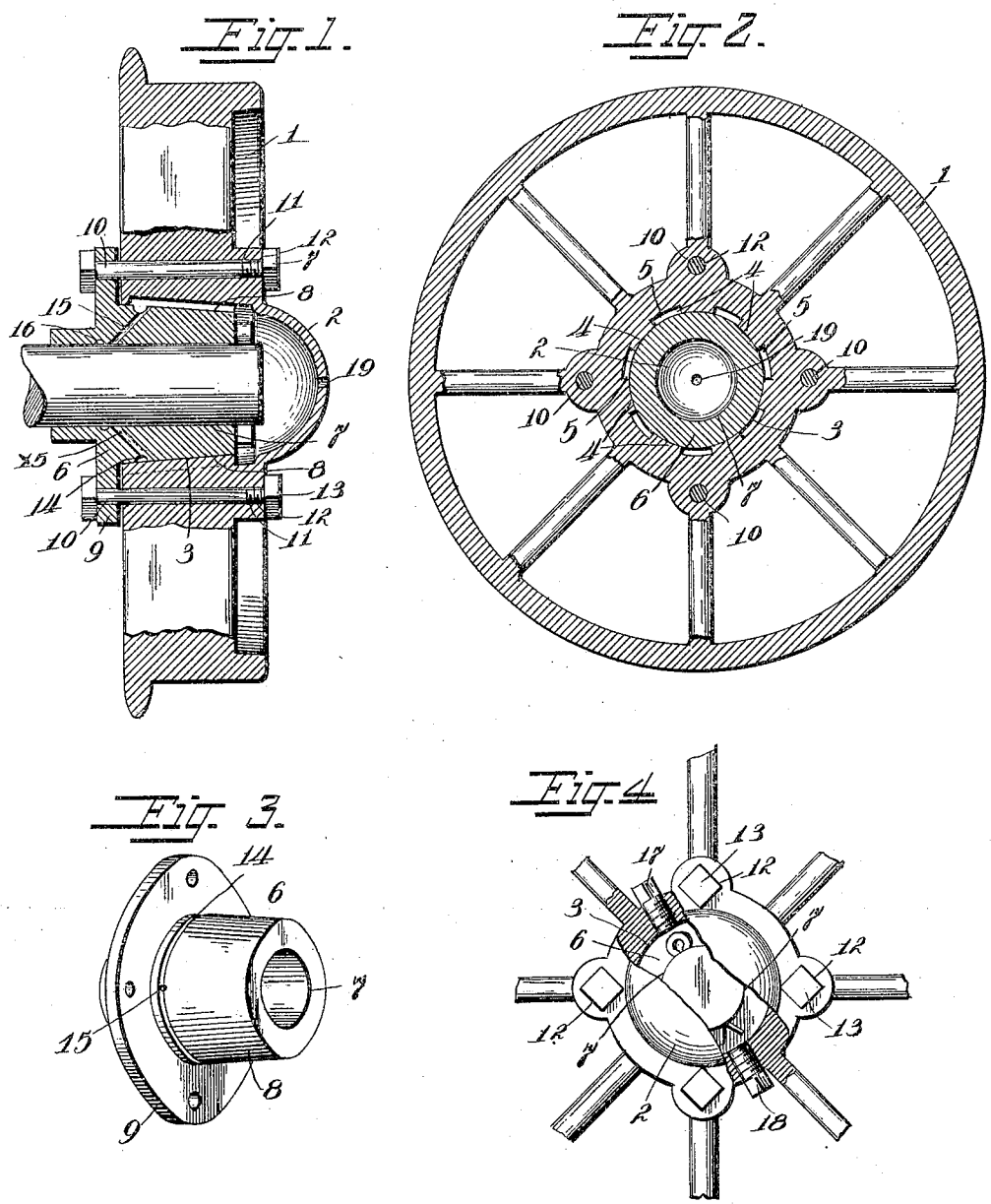
Witnesses
Milton C. Lenoir
Geo. H. Hamlin
Inventors
William H. Thompson
Clayton J. Swank
by Henry N. Copp
their Attorney

UNITED STATES PATENT OFFICE.

WILLIAM H. THOMPSON AND CLAYTON J. SWANK, OF NORTON, VIRGINIA.

LUBRICATING CAR-WHEEL.

No. 822,560.

Specification of Letters Patent.

Patented June 5, 1906.

Application filed June 14, 1905. Serial No. 265,170.

*To all whom it may concern:*

Be it known that we, WILLIAM H. THOMPSON and CLAYTON J. SWANK, citizens of the United States, residing at Norton, county of Wise, and State of Virginia, have invented certain new and useful Improvements in Lubricating Car-Wheels, of which the following is a specification.

This invention relates to lubricating car-wheels, and more particularly to mining-car wheels.

Heretofore various difficulties have been experienced in the use of mining-car wheels having removable hubs, among which are the necessity for removing the entire hub when it is desired to remove the wheel from the axle, breaking of the hub after continued use, loosening of the fastening connecting the hub to the wheel, and other defects. Many well-lubricated wheels of common form soon become useless because the hub invariably wears out before the wheel-tread, which difficulty the present invention overcomes by providing an improved removable hub.

The object of our invention is the provision of a lubricating car-wheel, particularly one adapted for use in connection with mining-cars, wherein a removable hub of improved construction is provided, together with novel means for connecting the hub to the wheel, whereby loosening of the connecting means is prevented, and a further object is the provision of a removable hub for a lubricating mining-car wheel which can be taken out without difficulty when worn and replaced by a new hub; further, to provide an improved construction whereby the linchpin which holds the wheel onto the axle may be readily removed without taking out the hub, and, finally, to provide an improved construction of hub and wheel whereby the lubricant is evenly distributed to the axle and the wear is made uniform throughout the bearing parts.

Having the foregoing and other not specifically mentioned objects in view the invention comprises certain improved features and novel combinations of parts set forth in detail hereinafter and recited in the appended claims.

In the accompanying drawings, Figure 1 is a vertical section. Fig. 2 is a section at right angles to Fig. 1. Fig. 3 is a perspective detail of the hub removed, and Fig. 4 is a sectional view showing the removable plugs which close the opening through which the linchpin may be inserted and removed.

The wheel is shown at 1 and is provided with an integral lubricant-cup 2 on its outer face, while its bore 3 has a plurality of segments 4, with intermediate lubricant-recesses 5 extending from a point adjacent its inner face to the lubricant-cup and there terminating. The bore 3 tapers from the inner face of the car-wheel toward the lubricant-cup for a purpose which will now appear.

The hub 6, which has the internal bore 7, which receives the ordinary axle, is tapered on its outer surface 8 to fit in the tapered bore 3, and this hub has a flange 9, through which screw-bolts 10 pass and the threads of which, after engaging screw-threaded openings 11 in the center portion of the wheel, project beyond the outer face thereof at points 12 around the lubricant-cup and are there provided with jam-nuts 13. The flange 9 is not in contact with the face of the wheel, and hence the bolts and nuts are continually straining or drawing the tapered hub into the bore 3, thus insuring a perfectly tight fit and avoiding all looseness, while at the same time the provision of the bolts threaded into the wheel in connection with jam-nuts absolutely prevents the hub-fastenings from backing out and allowing the hub to become loosened. By this construction we obviate a common defect in mining-car wheels employing removable hubs, for with those constructions where the screws are simply threaded into the wheel the continual wear and tear to which wheels of this class are subjected soon causes the fastenings to loosen with disastrous results.

Around the exterior of the hub 6 runs a groove 14, which is in communication with the recesses 5, and this groove communicates with lubricating-ducts 15, extending to the interior of the hub to feed the lubricant to the axle. The interior of the hub is by preference provided with a groove 16 to better distribute the lubricant on the axle. The axle will project through the hub into the lubricant-cup and be provided with the usual linchpin. To obviate the necessity for removing the hub whenever it is desired to take the wheel off the axle, the diametrically opposite openings 17 and 18 are provided in the lubricant-cup, and these are closed by screw-threaded plugs. In the center of the lubricant-cup is an opening 19 for the introduction of the lubricant.

Our lubricating-wheel obviates the defects incident to lubricating-wheels heretofore known to the art, and we provide a construction wherein the hub can be readily and easily removed when desired, and yet it is always firmly held and the fastenings cannot become loose, while it is possible to easily remove the wheel from the axle by drawing out the linchpin through the openings 17 and 18, and the removal of the hub is thus obviated. The provision of the segments gives a firm and wide contact for the hub, and the intermediate grooves afford means for evenly feeding the lubricant to the groove in the hub and thence to the axle.

Having thus described our invention, what we claim as new, and desire to secure by Letters Patent, is—

1. In a car-wheel, the combination with a wheel having a bore, of a hub fitted in said bore and adapted itself to receive the axle, said hub having a flange separated from and out of contact with the wheel, and straining-bolts passing through the flange and through the wheel and provided with jam-nuts on their opposite ends.

2. In a car-wheel, the combination with a wheel having a bore, of a hub fitted in said bore and adapted itself to receive the axle, and bolts passing through the hub and screw-threaded into the wheel and provided with jam-nuts on their opposite ends.

3. The combination with a wheel having a tapered bore, of a hub fitted in said bore and adapted itself to receive the axle, said hub having a flange separated from and out of contact with the wheel, and straining-bolts connecting the flange to the wheel.

4. The combination of a wheel having a tapering bore, of a hub having a tapered portion received in the tapered bore, and bolts passing through the hub and screw-threaded into the wheel and provided with jam-nuts on their opposite ends.

5. The combination with a wheel having a tapered bore, of a hub fitted in said bore and adapted itself to receive the axle, said hub having a flange separated from and out of contact with the wheel, and straining-bolts passing through the flange and screw-threaded into the wheel and provided with jam-nuts on their opposite ends.

In testimony whereof we hereunto affix our signatures in presence of two witnesses.

WILLIAM H. THOMPSON.
CLAYTON J. SWANK.

Witnesses:
  C. C. HYATT,
  W. T. WILLIAMS.